(12) United States Patent
Kano et al.

(10) Patent No.: US 9,785,829 B2
(45) Date of Patent: Oct. 10, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Ryuji Kano, Kanagawa (JP); Takeshi Onishi, Kanagawa (JP); Noriji Kato, Kanagawa (JP); Keiichi Nemoto, Kanagawa (JP); Ryota Ozaki, Kanagawa (JP); Daisuke Ikeda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 69 days.

(21) Appl. No.: 14/699,430

(22) Filed: Apr. 29, 2015

(65) Prior Publication Data

US 2016/0098827 A1 Apr. 7, 2016

(30) Foreign Application Priority Data

Oct. 7, 2014 (JP) ................................. 2014-206171

(51) Int. Cl.
*G06T 9/00* (2006.01)
*G06K 9/00* (2006.01)

(52) U.S. Cl.
CPC ..... *G06K 9/00362* (2013.01); *G06K 9/00771* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,317,388 B2* | 1/2008 | Kawabe | ................. | G01S 1/70 205/206 |
| 7,330,775 B2* | 2/2008 | Orita | ................. | B62D 57/032 318/568.11 |
| 7,702,420 B2* | 4/2010 | Goto | ................. | G05D 1/0246 700/245 |
| 8,170,581 B2* | 5/2012 | Choo | ................. | G08B 25/016 455/456.1 |
| 9,082,278 B2* | 7/2015 | Park | ................. | G06K 9/00771 |
| 2005/0218292 A1* | 10/2005 | Kawabe | ................. | G01S 1/70 250/206 |
| 2009/0268030 A1* | 10/2009 | Markham | ............. | G01S 3/54 348/158 |

(Continued)

FOREIGN PATENT DOCUMENTS

JP 2011-086045 A 4/2011

*Primary Examiner* — Anand Bhatnagar
(74) *Attorney, Agent, or Firm* — Oliff PLC

(57) ABSTRACT

An information processing apparatus includes a setting unit, an extracting unit, and an associating unit. The setting unit sets a position of a first-type person in a region within a predetermined distance from a communication device installed in a structure in a case where the communication device communicates with a mobile terminal carried by the first-type person. The extracting unit extracts a person from an image captured by an image capturing device installed in the structure. The associating unit associates the extracted person with information indicating the first-type person in a case where a relationship between the region and the position of the person satisfies a predetermined condition.

6 Claims, 15 Drawing Sheets

(56) References Cited

U.S. PATENT DOCUMENTS

| | | | | |
|---|---|---|---|---|
| 2010/0195872 A1* | 8/2010 | Velardo | ............. | G06K 9/00771 |
| | | | | 382/106 |
| 2010/0299163 A1* | 11/2010 | Kang | .................... | G06Q 10/02 |
| | | | | 705/5 |
| 2011/0028160 A1* | 2/2011 | Roeding | ................ | G06Q 30/00 |
| | | | | 455/456.1 |
| 2015/0341599 A1* | 11/2015 | Carey | ................... | H04N 7/181 |
| | | | | 348/150 |
| 2016/0260161 A1* | 9/2016 | Atchley | .............. | G05D 1/0297 |

* cited by examiner

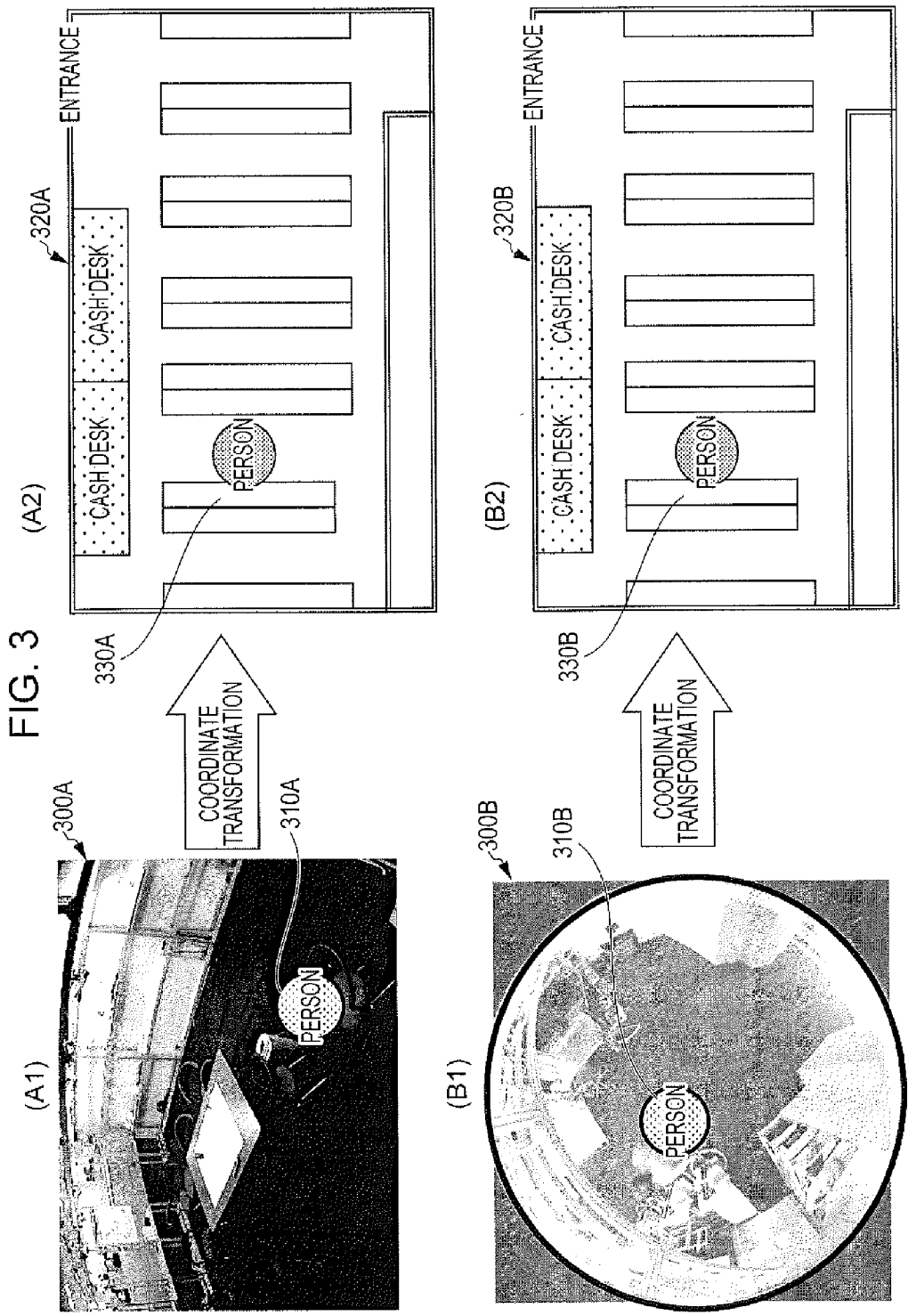

FIG. 5

| IMAGE-CAPTURING DATE/TIME | x-COORDINATE | y-COORDINATE | IMAGE FEATURE | CLERK/ CUSTOMER FLAG | CLERK ID |
|---|---|---|---|---|---|
| | | | | | |

FIG. 6

| CLERK ID | NAME | IMAGE FEATURE |
|---|---|---|
| | | |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-206171 filed Oct. 7, 2014.

BACKGROUND

Technical Field

The present invention relates to an information processing apparatus, an information processing method, and a non-transitory computer readable medium.

SUMMARY

According to an aspect of the invention, there is provided an information processing apparatus including a setting unit, an extracting unit, and an associating unit. The setting unit sets a position of a first-type person in a region within a predetermined distance from a communication device installed in a structure in a case where the communication device communicates with a mobile terminal carried by the first-type person. The extracting unit extracts a person from an image captured by an image capturing device installed in the structure. The associating unit associates the extracted person with information indicating the first-type person, in a case where a relationship between the region and the position of the person satisfies a predetermined condition.

BRIEF DESCRIPTION OF THE DRAWINGS

Exemplary embodiments of the present invention will be described in detail based on the following figures, wherein:

FIG. 3 is an explanatory diagram illustrating an example of processing according to the first exemplary embodiment;

FIG. 5 is an explanatory chart illustrating an example of a data structure of a person-attribute table;

FIG. 6 is an explanatory chart illustrating an example of a data structure of a clerk table;

DETAILED DESCRIPTION

First Exemplary Embodiment

Hereinafter, examples of various exemplary embodiments of the present invention will be described with reference to the drawings.

Figure 1:
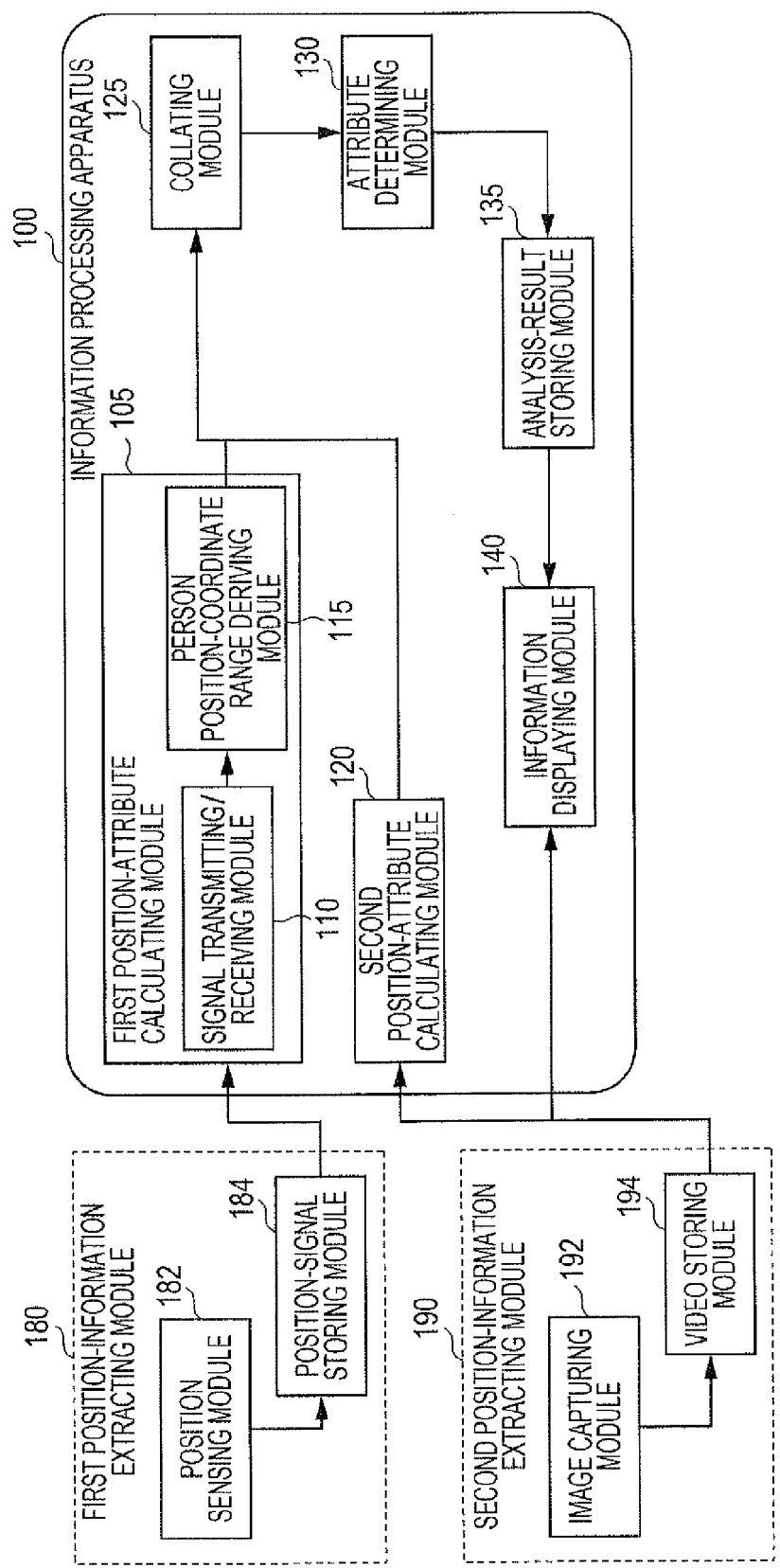
FIG. 1 is a diagram conceptually illustrating an example of a module configuration in a first exemplary embodiment.

FIG. 1 conceptually illustrates an example of a module configuration in a first exemplary embodiment.

Note that the term "module" refers to generally logically separable components of software (computer programs) and hardware or the like. Modules in the exemplary embodiment thus refer to not only modules in a computer program but also modules in a hardware configuration. Accordingly, the description of the exemplary embodiment also serves as a description of a computer program for causing a computer to function as the modules (a program for causing a computer to execute steps, a program for causing a computer to function as components, and a program for causing a computer to implement functions) as well as a system and a method therefor. Meanwhile, the term "to store" and other terms equivalent to "to store" are used in descriptions. In a case where the exemplary embodiment describes a computer program, the term means storing something in a storage device or controlling something so as to store something in a storage device. The modules are provided for respective functions on a one-to-one basis. However, in implementing the functions, one program may constitute one module; one program may constitute multiple modules; and multiple programs may constitute one module. In addition, one computer may run multiple modules, and multiple computers may run one module in a distributed or parallel processing environment. Note that one module may include another module. Moreover, the term "connection" is used for not only a physical connection but also a logical connection (such as data exchange, instructions, or a reference relationship among data pieces). The term "predetermined" refers to having been determined before target processing. This term is used in such a manner as to include the meaning of being determined according to the situation at the determination time or to the situation thus far only before target processing, regardless of whether before or even after the start of processing in the present exemplary embodiment. Meanwhile, in a case of multiple "predetermined values", the values may be different from one another, or two or more of the values may be the same (including all of the values). Moreover, an expression meaning "if A, then B" is used in such a manner as to mean that "it is determined whether A holds true, and if it is determined that A holds true, then B is performed". However, this excludes a case where the determination of whether A holds true is not needed.

A system or a device includes not only a configuration in which multiple computers, hardware, devices, and the like are connected to each other through a communication unit such as a network (including a communication connection on an one-to-one basis), but also a configuration in which a computer, hardware, a device, or the like is implemented. The terms "device" and "system" are used as terms having the same meaning. It goes without saying that the "system" does not include a mere social "system" built in accordance with agreements worked out by humans.

In addition, to perform a processing operation or multiple processing operations in each module, the module reads target information from a storage device for each processing, performs the processing, and writes a processing result to the storage device. Accordingly, explanations of reading the content from the storage device before processing and writing the content to the storage device after the processing are omitted in some cases. Here, the storage device may include a hard disk, a random access memory (RAM), an external storage medium, a storage device connected through a communication network, a register in a central processing unit (CPU), and other devices.

An information processing apparatus 100 according to the first exemplary embodiment distinguishes between a person of a first type (hereinafter, referred to as a first-type person) and a person who is not of a first type (hereinafter, referred to as a second-type person). As illustrated in the example in FIG. 1, the information processing apparatus 100 includes a first position-attribute calculating module 105, a second position-attribute calculating module 120, a collating module 125, an attribute determining module 130, an analysis-result storing module 135, and an information displaying module 140. The information processing apparatus 100 is connected to a first position-information extracting module 180 and a second position-information extracting module 190. The first position-information extracting module 180 and the second position-information extracting module 190 are installed in a structure. Examples of the structure include a store, a school, a classroom, a hall, a building, a station, an airport, an amusement facility, and a ship. First-type persons and second-type persons both move in any of these structures. The information processing apparatus 100 is used to determine a line of movement of each second-type person (a path of the person). In the case of a store, the first-type persons are clerks, and the second-type persons are customers or the like. In the case of a school, a classroom, or the like, the first-type persons are teachers, and the second-type persons are students or the like. In the case of a station, the first-type persons are station employees, and the second-type person are passengers or the like. Note that these are provided for the illustrative purpose. Examples of first-type persons and second-type persons may be reversed. In the examples in the following description, the structure is a store, the first-type persons are clerks, and the second-type persons are customers. Note that each first-type person carries a mobile terminal capable of communicating with the first position-information extracting module 180. The method of carrying the mobile terminal may include wearing the mobile terminal. Accordingly, the position of the mobile terminal is equivalent to the position of the person carrying the mobile terminal.

The information processing apparatus 100 detects, for example, persons in the store from an image to acquire lines of movement of the persons. Since clerks carry the mobile terminals, the information processing apparatus 100 subtracts lines of movement of the persons carrying the mobile terminals from the lines of movement acquired from the image to thereby acquire lines of movement of customers visiting the store.

The term "person" hereinafter includes information indicating the person in the context.

The first position-information extracting module 180 and the second position-information extracting module 190 acquire the positions of multiple persons present in the structure.

The first position-information extracting module 180 includes a position sensing module 182 and a position-signal storing module 184. At least one position sensing module 182 is installed in the structure. The first position-information extracting module 180 acquires through wireless communication the position of a mobile terminal carried by a person. The mobile terminal includes a mobile phone (which may be a smartphone), a sensor, and other devices. The first position-information extracting module 180 has a function of a base station.

The position sensing module 182 is connected to the position-signal storing module 184. The position sensing module 182 communicates with the mobile terminal carried by the person, through the wireless communication. The performance of the communication may herein be good enough for one of the communicating devices (the position sensing module 182 or the mobile terminal) to detect the other (the mobile terminal or the position sensing module 182). In the wireless communication, for example, Bluetooth (registered trademark), near field communication (NFC), and the like for short distance wireless communication may be used.

The position-signal storing module 184 is connected to the position sensing module 182 and to the first position-attribute calculating module 105 of the information processing apparatus 100. In the position-signal storing module 184, information indicating that the position sensing module 182 has performed communication is stored. The position-signal storing module 184 transmits the information to a signal transmitting/receiving module 110 of the information processing apparatus 100. For example, the following are stored: date and time when the communication has been performed (year, month, day, hour, minute, second, and a time unit equal to or less than a second, or a combination of any of these may be used. The same is hereinafter applied.); information for identifying the mobile terminal having performed communication (or information for identifying the person carrying the mobile terminal (hereinafter, also referred to as clerk identification (ID))); signal intensity; and information for identifying the position sensing module 182. Note that the identification information refers to information for uniquely identifying a target (such as a clerk) in the present exemplary embodiment.

Note that the first position-information extracting module 180 may be the mobile terminal carried by the person. In this case, when communication with the communication device (such as the base station) installed in the structure is performed, information indicating that the communication has been performed is stored in the first position-information extracting module 180 that is the mobile terminal, and the first position-information extracting module 180 transmits the information to the signal transmitting/receiving module 110 of the information processing apparatus 100. In an example in the following description, the first position-information extracting module 180 is the base station installed in the structure.

The second position-information extracting module 190 includes an image capturing module 192 and a video storing module 194. At least one image capturing module 192 is installed in the structure. The second position-information extracting module 190 captures images in the structure.

The image capturing module 192 is connected to the video storing module 194. The image capturing module 192 captures images of persons in the structure. The image capturing module 192 such as a camera may be a typical two-dimensional camera, an omnidirectional camera, or a three-dimensional camera. The images may be moving images. Each "moving image" is composed of multiple frames (still images) captured in a time series, and the frames are reproduced in a time series. The images may also be still images. The still images may be captured in advance at regular intervals or may be captured in accordance with an instruction from the position sensing module 182 when the position sensing module 182 communicates with the mobile terminal. The direction and the angle of capturing images by the image capturing module 192 may be fixed or autonomously variable. For example, the direction and the angle may be controlled for positions of persons.

The video storing module 194 is connected to the image capturing module 192 and the second position-attribute calculating module 120 and the information displaying module 140 of the information processing apparatus 100. In the video storing module 194, images captured by the image capturing module 192 are stored. The video storing module 194 transmits the images to the second position-attribute calculating module 120. In the video storing module 194, for example, the date and time of image capturing, image-capturing conditions (the direction and the angle of capturing images by the image capturing module 192), information for identifying the image capturing module 192, and the like are stored.

The first position-attribute calculating module 105 includes the signal transmitting/receiving module 110 and a person position-coordinate range deriving module 115 and is connected to the position-signal storing module 184 of the first position-information extracting module 180. The first position-attribute calculating module 105 calculates the position of the mobile terminal in the structure in response to the communication between the position sensing module 182 and the mobile terminal.

The signal transmitting/receiving module 110 is connected to the person position-coordinate range deriving module 115. The signal transmitting/receiving module 110 receives information indicating that communication has been performed, from the first position-information extracting module 180 (one of the base station or the like installed in the structure and the mobile terminal) and delivers the information to the person position-coordinate range deriving module 115.

The person position-coordinate range deriving module 115 is connected to the signal transmitting/receiving module 110 and the collating module 125. When the position sensing module 182 installed in the structure communicates with the mobile terminal of each first-type person, the person position-coordinate range deriving module 115 sets the position of the mobile terminal of the first-type person in a region defined by a predetermined distance from the position sensing module 182 located in the center of the region. This means that the first-type person was present near the position sensing module 182 installed in the structure at the date and time when the communication was performed. Here, the region is denoted by $L_1(t)$. Note that t represents the date and time when communication is performed. For example, when signals are exchanged between the position sensing module 182 and the mobile terminal, the person position-coordinate range deriving module 115 may derive, as the position coordinate range $L_1(t)$ of the mobile terminal, a region within a radius r (r represents the predetermined distance) of the position sensing module 182 (base station) exhibiting the highest signal strength. It goes without saying that the position sensing module 182 (base station) is located at a predetermined position. For example, the position coordinate range $L_1(t)$ may be set by using a table denoting the position of each position sensing module 182 (such as X and Y coordinates indicating the position in the structure).

The second position-attribute calculating module 120 is connected to the collating module 125 and the video storing module 194 of the second position-information extracting module 190. The second position-attribute calculating module 120 extracts a person from an image captured by the image capturing module 192 installed in the structure. Extraction of the person makes it possible to extract the position of the person. In addition, acquisition of positions of the person in a time series makes it possible to extract a line of movement of the person. As a technology for extracting a person from an image, an existing technology may be used. For example, a human body recognition technology, a face recognition technology, and other technologies may be used. For example, the second position-attribute calculating module 120 may extract a person $P_k$ from an acquired image to derive a position coordinate $C^1_k(t)$ that is the position of a person in the store (k represents the person No. and t represents date and time) from the position of the person $P_k$ in the image. It goes without saying that in a case where multiple persons are present in the captured image, the persons are extracted.

The second position-attribute calculating module 120 uses at least an image captured at the time when the position sensing module 182 communicates with the mobile terminal (the time may be a predetermined period including a time before, after, or before and after the time of the communication).

In addition, the second position-attribute calculating module 120 may have a function of tracking persons $P_k$ regarded as the same person. In other words, the second position-attribute calculating module 120 may track persons $P_k$ as the same person in a period in which a position coordinate $C^1_k(t')$ is continuously acquirable.

Results of processing performed by the second position-attribute calculating module 120 are stored in, for example, a person-attribute table 500. FIG. 5 is an explanatory chart illustrating an example of a data structure of the person-attribute table 500. The person-attribute table 500 has an image-capturing date/time column 510, an x-coordinate column 520, a y-coordinate column 530, an image feature column 540, a clerk/customer flag column 550, and a clerk-ID column 560. In the image-capturing date/time column 510, the date and time when a target image has been captured is stored. In the x-coordinate column 520, an x coordinate of the position of a person in the image is stored. In the y-coordinate column 530, a y coordinate of the position of the person in the image is stored. In the image feature column 540, the image feature of the person is stored. In the clerk/customer flag column 550, a flag indicating whether the person is a clerk (first-type person) or a customer (second-type person) is stored. If the person is a clerk, a clerk ID of the clerk is stored in the clerk-ID column 560. Among these columns, the second position-attribute calculating module 120 stores values in the image-capturing date/time column 510, the x-coordinate column 520, the y-coordinate column 530, and the image feature column 540, respectively.

FIG. 3 is an explanatory diagram illustrating an example of processing according to the first exemplary embodiment (performed by the second position-attribute calculating module 120).

A camera-captured image 300A illustrated in Part (A1) of FIG. 3 has been captured by an image capturing module 192 that is a typical camera. The camera-captured image 300A contains a person 310A. The second position-attribute calculating module 120 may generate, from the camera-captured image 300A, a store view 320A that is a kind of plan view illustrated in the example in Part (A2) of FIG. 3 or may generate the store view 320A in advance. The second position-attribute calculating module 120 extracts the person 310A from the camera-captured image 300A and transforms the position of the person 310A in the camera-captured image 300A to the position in the store view 320A. For example, an affine transformation may be used.

An omnidirectional-camera-captured image 300B illustrated in Part (B1) in FIG. 3 is captured by an image capturing module 192 that is an omnidirectional camera. The omnidirectional-camera-captured image 300B contains a person 310B. The second position-attribute calculating module 120 may generate, from the omnidirectional-camera-captured image 300B, a store view 320B that is a kind of plan view illustrated in the example in Part (B2) of FIG. 3 or may generate the store view 320B in advance. The second position-attribute calculating module 120 extracts the person 310B from the omnidirectional-camera-captured image 300B and transforms the position of the person 310B in the omnidirectional-camera-captured image 300B to the position in the store view 320B. For example, the second position-attribute calculating module 120 may generate transformations in advance by sampling corresponding points between the omnidirectional-camera-captured image 300B and the store view 320B that is a plan view image and may thereby calculate the position of a person 330B in the store view 320B by using an appropriate one of the transformations.

The collating module 125 is connected to the person position-coordinate range deriving module 115, the second position-attribute calculating module 120, and the attribute determining module 130. The attribute determining module 130 is connected to the collating module 125 and the analysis-result storing module 135.

The collating module 125 and the attribute determining module 130 associate a person extracted by the second position-attribute calculating module 120 with first-type-person information, in a case where a relationship between a region set by the first position-attribute calculating module 105 and the position of the extracted person satisfies a predetermined condition. In an association technique example, information indicating whether a person is a first-type person may be assigned as an attribute to the person, or a first-type person table may be prepared to store information for identifying a person.

In addition, the "predetermined condition" may be, for example, a condition that only one person who is one of the persons extracted by the second position-attribute calculating module 120 is present in the region set by the person position-coordinate range deriving module 115. If this condition is satisfied, that is, if a person extracted by the second position-attribute calculating module 120 is present in the region, the person is assigned an attribute representing a first-type person.

The collating module 125 performs processing of collation between two position attributes, that is, compares a result of processing by the person position-coordinate range deriving module 115 with a result of processing by the second position-attribute calculating module 120. For example, if only one position coordinate $C^1_k(t)$ is present in the position coordinate range $L_1(t)$, a person obtained from a signal acquired from the mobile terminal and a person obtained by the position sensing module 182 are determined to be the same person. Then, the position coordinate range $L_1(t)$ and the position coordinate $C^1_k(t)$ of the identified same person are associated with the person $P_k$. For another time t, a position coordinate range $L_1(t')$ at a certain time t' and a position coordinate $C^1_k(t')$ that are associated with the person $P_k$ are also collated.

The attribute determining module 130 determines whether the position coordinate in the camera-captured image is that of the first-type person (such as a clerk) or the second-type person (such as a customer) on the basis of a result of the collation by the collating module 125. Specifically, the person at the position coordinate $C^1_k(t)$ who is identifiable as the person in the position coordinate range $L_1(t)$ is assigned the attribute representing a first-type person.

The attribute determining module 130 may also associate, with information indicating a second-type person (hereinafter, referred to as second-type-person information), a person other than the person associated with the first-type-person information. Specifically, the position coordinate $C^1_k(t)$ that is not associated with the first-type-person information is associated with an attribute representing a second-type person.

The analysis-result storing module 135 is connected to the attribute determining module 130 and the information displaying module 140. In the analysis-result storing module 135, information associated by the attribute determining module 130 such as the person-attribute table 500 described above is stored. The attribute determining module 130 stores values in the clerk/customer flag column 550 and the clerk-ID column 560.

The information displaying module 140 is connected to the analysis-result storing module 135 and the video storing module 194 of the second position-information extracting module 190. The information displaying module 140 presents a line of movement of a person associated with the second-type-person information by the attribute determining module 130. The presentation is performed for easier analyses of behavior patterns of persons in the structure. For example, the information displaying module 140 outputs paths of movements (lines of movement) of a clerk and a customer in a discriminable manner, for example, in such a manner as to provide the clerk and the customer with visually different marks, respectively. More specifically, the clerk and the customer may be assigned respective different color attributes or attribute names in the display. For example, a clerk table 600 may be prepared in advance, and a line of movement may be displayed with the name or the like corresponding to the clerk ID. FIG. 6 is an explanatory chart illustrating an example of a data structure of the clerk table 600. The clerk table 600 has a clerk-ID column 610, a name column 620, and an image feature column 630. In the clerk-ID column 610, clerk IDs are stored. In the name column 620, the name of each clerk having the corresponding clerk ID is stored. In the image feature column 630, an image feature of the clerk is stored. The clerk ID may be identified by comparing a value in the image feature column 630 of the clerk table 600 and a value in the image feature column 540 of the person-attribute table 500.

Figure 2A:
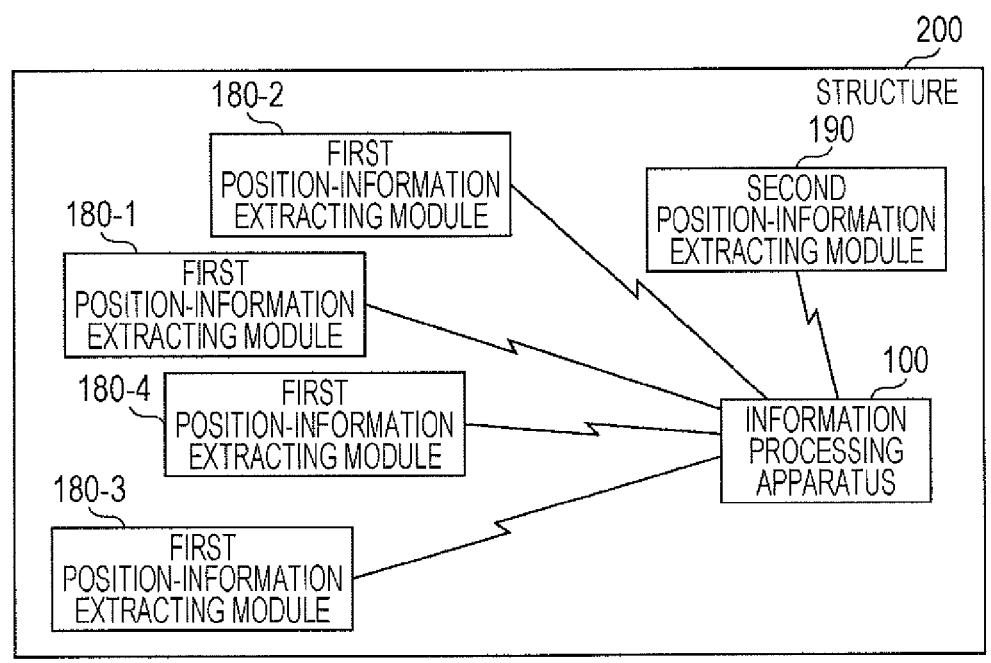
FIGS. 2A and 2B are explanatory diagrams each illustrating a configuration example of a system utilizing the present exemplary embodiments.
Figure 2B:
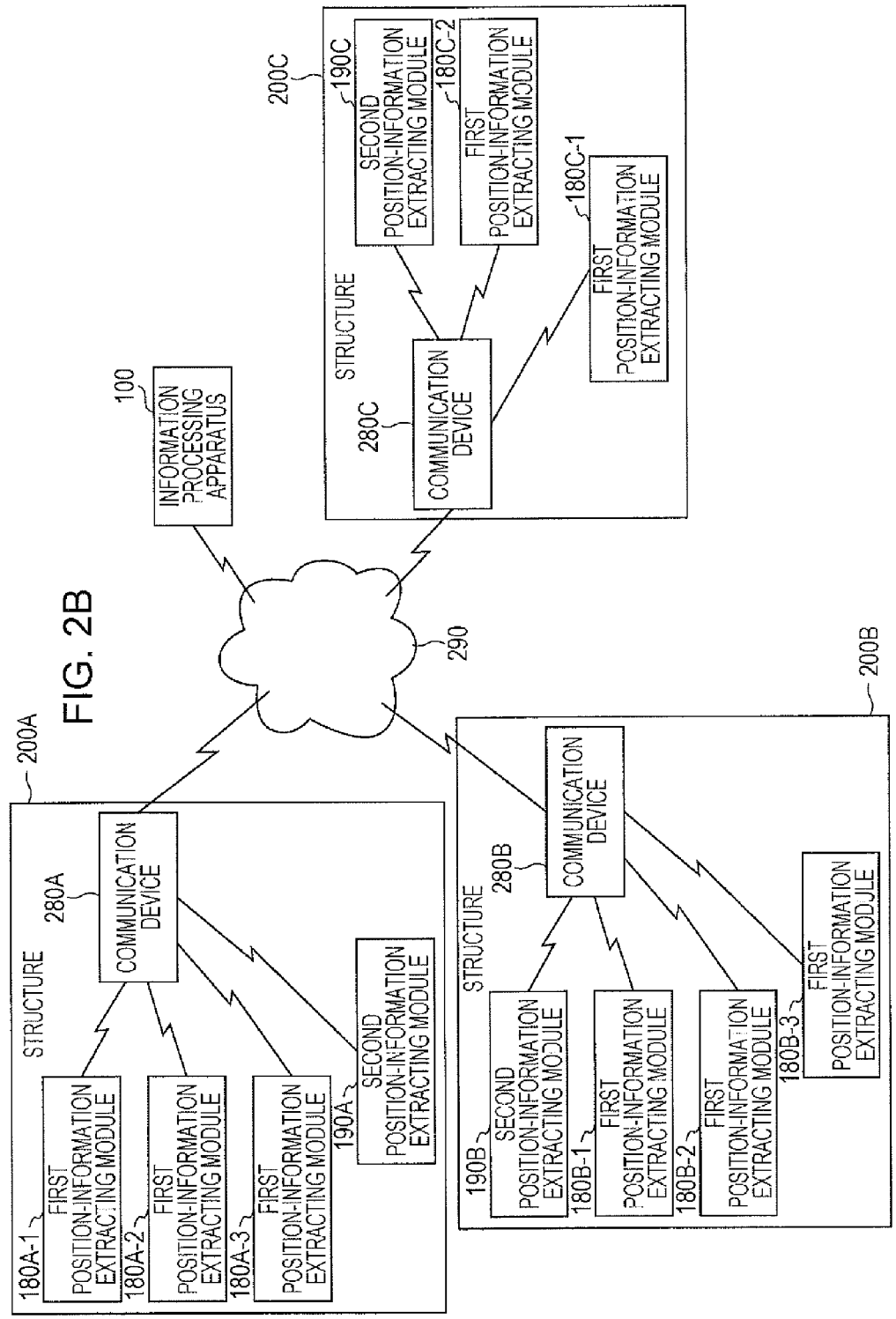

FIGS. 2A and 2B are explanatory diagrams each illustrating a configuration example of a system utilizing the present exemplary embodiments.

In the system configuration example illustrated in FIG. 2A, the information processing apparatus 100, a first position-information extracting module 180-1, a first position-information extracting module 180-2, a first position-information extracting module 180-3, a first position-information extracting module 180-4, and the second position-information extracting module 190 are installed in a structure 200. Although the example illustrates the four first position-information extracting modules 180-1 to 180-4 and the one second position-information extracting module 190, any other number of these modules may be used.

In the system configuration example illustrated in FIG. 2B, the information processing apparatus 100 is used in a cloud service. A first position-information extracting module 180A-1, a first position-information extracting module 180A-2, a first position-information extracting module 180A-3, a second position-information extracting module 190A, and a communication device 280A are installed in a structure 200A. A first position-information extracting module 180B-1, a first position-information extracting module 180B-2, a first position-information extracting module 180B-3, a second position-information extracting module 190B, and a communication device 280B are installed in a structure 200B. A first position-information extracting module 180C-1, a first position-information extracting module 180C-2, a second position-information extracting module 190C, and a communication device 280C are installed in a structure 200C. This means that the following configuration may be employed; the first position-information extracting modules 180 and the second position-information extracting module 190 are installed in each store without the information processing apparatus 100; information and images are transmitted to the information processing apparatus 100 via the corresponding communication device 280 and a communication network 290; and a result of processing by the information processing apparatus 100 is transmitted to information processing apparatuses used by persons in charge in the respective stores.

Figure 4:
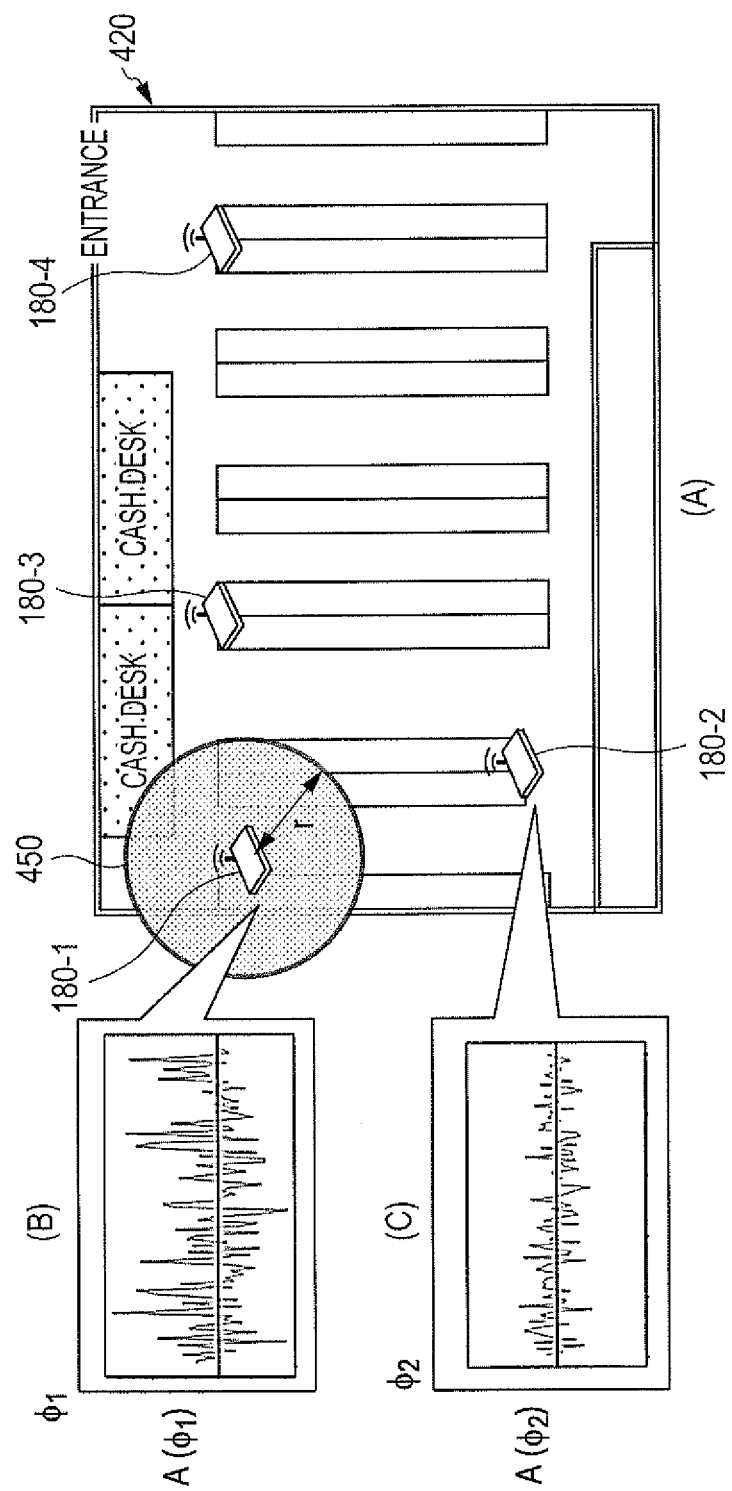
FIG. 4 is an explanatory diagram illustrating an example of processing according to the first exemplary embodiment.

FIG. 4 is an explanatory diagram illustrating an example of processing according to the first exemplary embodiment (performed by the person position-coordinate range deriving module 115).

In the example in Part (A) of FIG. 4, the first position-information extracting modules 180-1, 180-2, 180-3, and 180-4 in a store view 420 receive a signal from a mobile terminal. The graph example in Part (B) of FIG. 4 illustrates a waveform of the signal detected by the first position-information extracting module 180-1. The graph example in Part (C) of FIG. 4 illustrates a waveform of the signal detected by the first position-information extracting module 180-2. In this case, the waveform of the signal detected by the first position-information extracting module 180-1 has higher intensity than the waveform of the signal detected by the first position-information extracting module 180-2. Accordingly, a region 450 within a radius r of the first position-information extracting module 180-1 is set as the position coordinate range $L_1(t)$.

If the region 450 contains only one person among persons extracted by the second position-attribute calculating module 120, the person is assigned the attribute representing a clerk.

Figure 7:
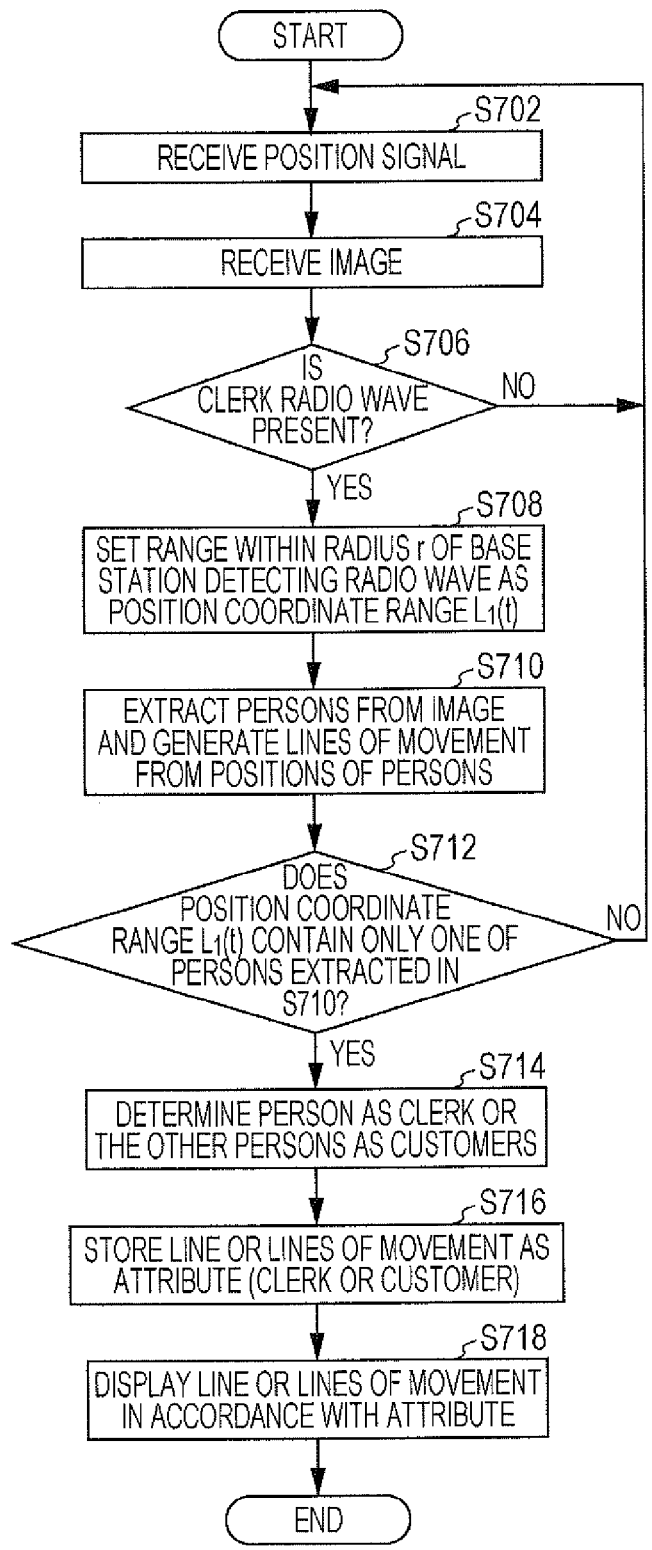
FIG. 7 is a flowchart illustrating an example of processing according to the first exemplary embodiment.

FIG. 7 is a flowchart illustrating an example of processing according to the first exemplary embodiment.

In step S702, the signal transmitting/receiving module 110 receives a position signal from the position-signal storing module 184 of the first position-information extracting module 180.

In step S704, the second position-attribute calculating module 120 receives an image from the video storing module 194 of the second position-information extracting module 190.

In step S706, the person position-coordinate range deriving module 115 determines whether a radio wave representing a clerk is present in the position signal. If the radio wave is present (if communication has been performed), the processing proceeds to step S708. In the other case, the processing returns to step S702.

In step S708, the person position-coordinate range deriving module 115 sets, as the position coordinate range $L_1(t)$, a range within the radius r of the base station detecting the radio wave.

In step S710, the second position-attribute calculating module 120 extracts persons from the image, arranges the positions of the persons in a time series, and generates lines of movement of the persons from the positions.

In step S712, the collating module 125 determines whether the position coordinate range $L_1(t)$ contains only one of the persons extracted in step S710. If the position coordinate range $L_1(t)$ contains the only one person, the processing proceeds to step S714. In the other case, the processing returns to step S702.

In step S714, the attribute determining module 130 determines the person as a clerk or the other persons as customers.

In step S716, the analysis-result storing module 135 stores the movement line information together with the attribute (a clerk or a customer).

In step S718, the information displaying module 140 displays the line or lines of movement in accordance with the attribute.

Second Exemplary Embodiment

Figure 8:
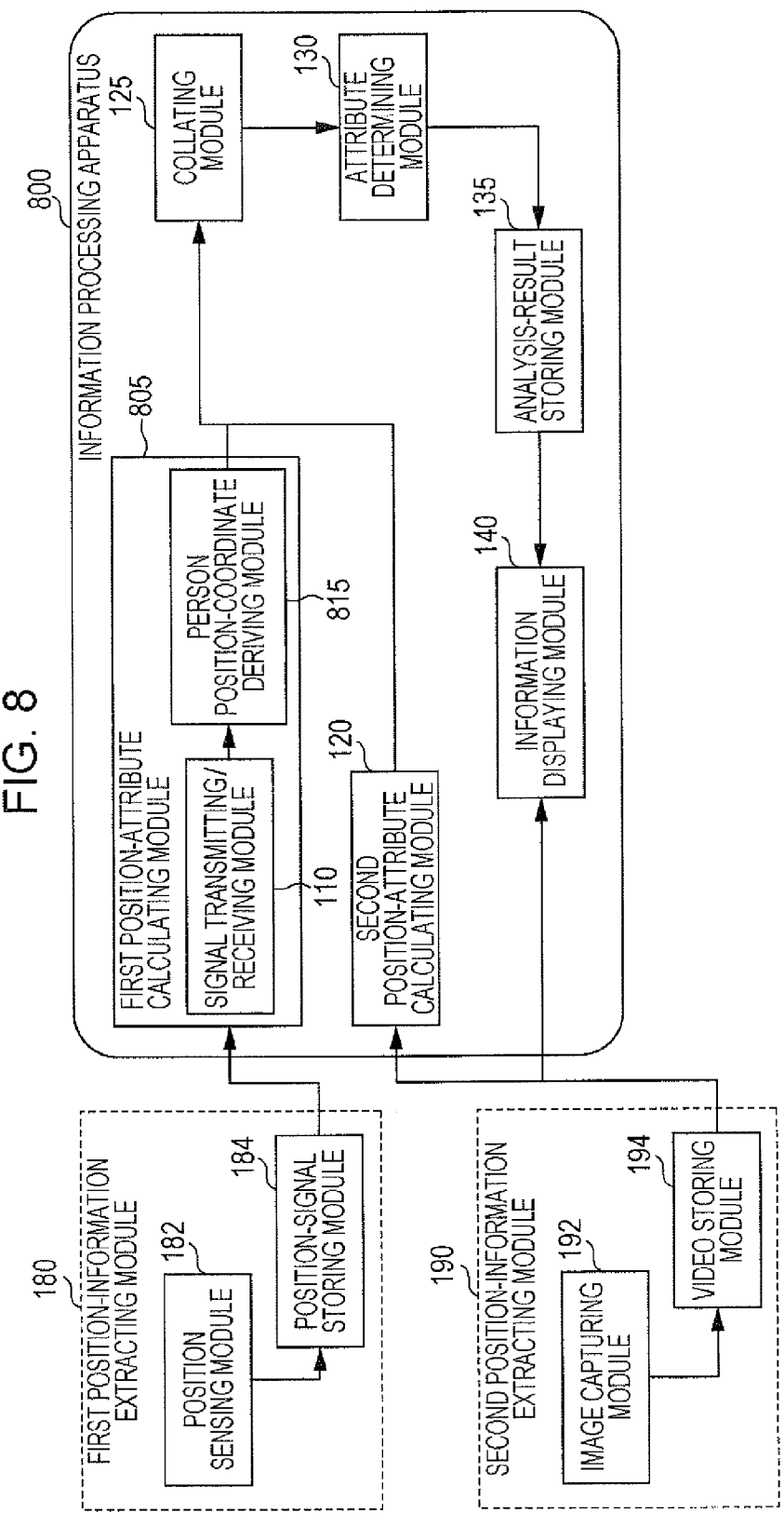
FIG. 8 is a diagram conceptually illustrating an example of a module configuration in a second exemplary embodiment.

FIG. 8 is a diagram conceptually illustrating an example of a module configuration in a second exemplary embodiment.

An information processing apparatus 800 includes a first position-attribute calculating module 805, the second position-attribute calculating module 120, the collating module 125, the attribute determining module 130, the analysis-result storing module 135, and the information displaying module 140. Note that the same kind of components as in the aforementioned exemplary embodiment are denoted by the same reference numerals, and repeated explanation is omitted (the same is hereinafter applied).

The position-signal storing module 184 is connected to the position sensing module 182 and the first position-attribute calculating module 805 of the information processing apparatus 800.

The video storing module 194 is connected to the image capturing module 192 and the second position-attribute calculating module 120 and the information displaying module 140 of the information processing apparatus 800.

The first position-attribute calculating module 805 includes the signal transmitting/receiving module 110 and a person position-coordinate deriving module 815 and is connected to the position-signal storing module 184 of the first position-information extracting module 180.

The signal transmitting/receiving module 110 is connected to the person position-coordinate deriving module 815.

The person position-coordinate deriving module 815 is connected to the signal transmitting/receiving module 110 and the collating module 125. When the position sensing module 182 installed in a structure communicates with a mobile terminal of a first-type person, the person position-coordinate deriving module 815 sets the position of the mobile terminal of the first-type person as the position of the position sensing module 182. The position is denoted by $L_2(t)$. Note that t represents the date and time when the communication is performed. For example, when signals are exchanged between the position sensing module 182 and the mobile terminal, the position of the position sensing module 182 (base station) at which the highest signal strength is exhibited may be derived as a position coordinate $L_2(t)$ of the mobile terminal.

Note that the second position-attribute calculating module 120 in the second exemplary embodiment may extract a person $P_k$ from an acquired image to derive, as a position coordinate $C^2_k(t)$ (k represents the person No. and t represents time) of the person $P_k$, the position of one of the position sensing modules 182 that is closest to the position of the person $P_k$ in the image.

The collating module 125 is connected to the person position-coordinate deriving module 815, the second position-attribute calculating module 120, and the attribute determining module 130. The attribute determining module 130 is connected to the collating module 125 and the analysis-result storing module 135.

The collating module 125 and the attribute determining module 130 in the second exemplary embodiment associate a person extracted by the second position-attribute calculating module 120 with first-type-person information, in a case where a relationship between the position set by the person position-coordinate deriving module 815 and the position of the extracted person satisfies a predetermined condition.

The "predetermined condition" may be, for example, a condition that the person is located closest to the position set by the person position-coordinate deriving module 815 among persons extracted by the second position-attribute calculating module 120. If this condition is satisfied, that is, if the person is located closest to the position set by the person position-coordinate deriving module 815, the person is assigned an attribute representing a first-type person.

For example, if only one position coordinate $C^2_k(t)$ is present at the position coordinate $L_2(t)$, the collating module 125 determines that a person obtained from a signal acquired from the mobile terminal and a person obtained by the second position-attribute calculating module 120 are the same person. Then, the position coordinates $L_2(t)$ and $C^2_k(t)$ of the identified same person are associated with the person $P_k$. For another time t, a position coordinate range $L_2(t')$ at a certain time t' and a position coordinate $C^2_k(t')$ that are associated with the person $P_k$ are also collated.

The attribute determining module 130 determines whether the position coordinate in a camera-captured image is that of a first-type person (such as a clerk) or a second-type person (such as a customer) on the basis of a result of the comparison by the collating module 125. Specifically, the person at the position coordinate $C^2_k(t)$ who is identifiable as the person in the position coordinate $L_2(t)$ is assigned the attribute representing a first-type person.

The attribute determining module 130 may also associate, with second-type-person information, a person other than the person associated with the first-type-person information. Specifically, a position coordinate $C^2_k(t)$ that is not associated with the first-type-person information is associated with an attribute representing a second-type person.

Figure 9:
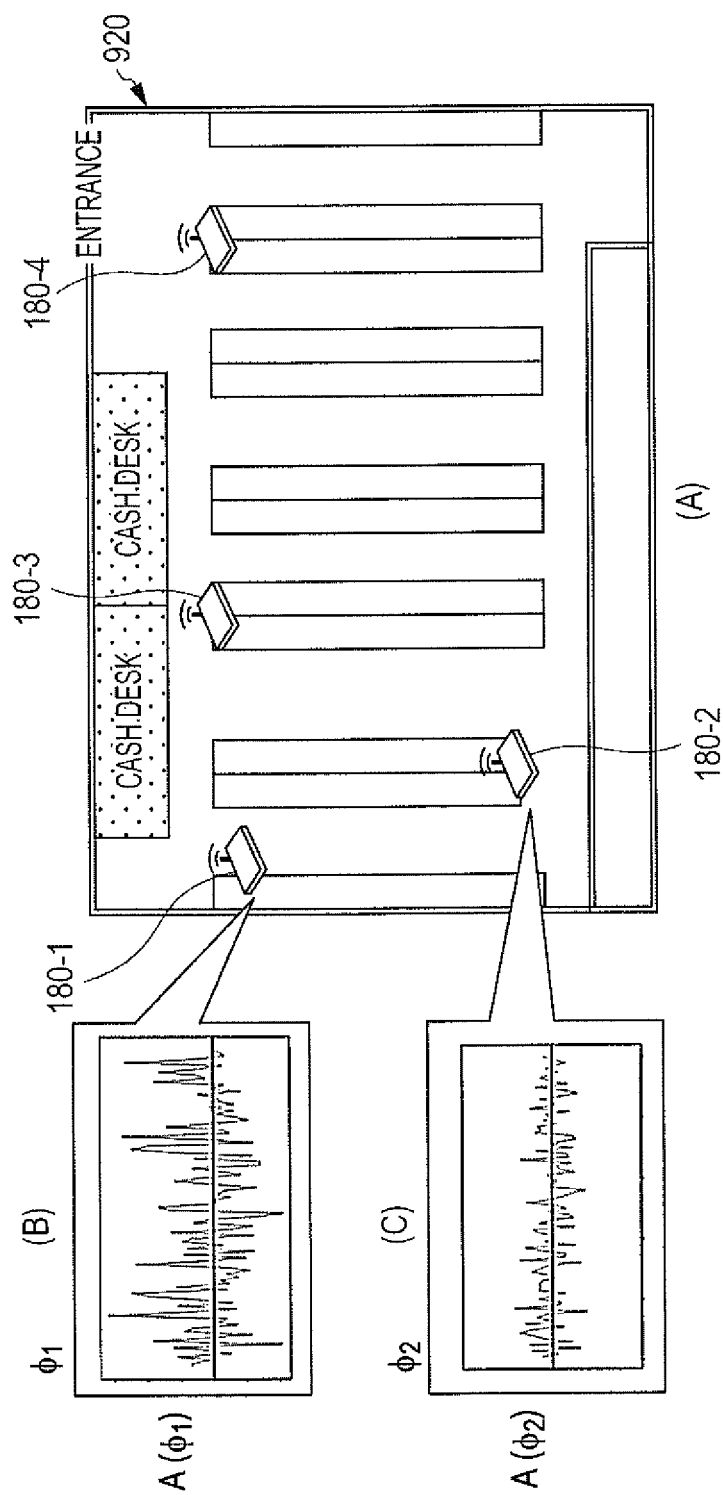
FIG. 9 is an explanatory diagram illustrating an example of processing according to the second exemplary embodiment.

FIG. 9 is an explanatory diagram illustrating an example of processing according to the second exemplary embodiment (performed by the person position-coordinate deriving module 815).

In the example in Part (A) of FIG. 9, the first position-information extracting modules 180-1, 180-2, 180-3, and 180-4 in a store view 920 receive a signal from a mobile terminal. The graph example in Part (B) of FIG. 9 illustrates a waveform of the signal detected by the first position-information extracting module 180-1. The graph example in Part (C) of FIG. 9 illustrates a waveform of the signal detected by the first position-information extracting module 180-2. In this case, the waveform of the signal detected by the first position-information extracting module 180-1 has higher intensity than the waveform of the signal detected by the first position-information extracting module 180-2. Accordingly, the position of the first position-information extracting module 180-1 is set as the position coordinate $L_2(t)$. In other words, the person position-coordinate deriving module 815 considers a person carrying the mobile terminal to be present at the position of the first position-information extracting module 180-1.

The person position-coordinate deriving module 815 assigns the attribute representing a clerk to the person located closest to the position coordinate $L_2(t)$ among the persons extracted by the second position-attribute calculating module 120.

Figure 10:
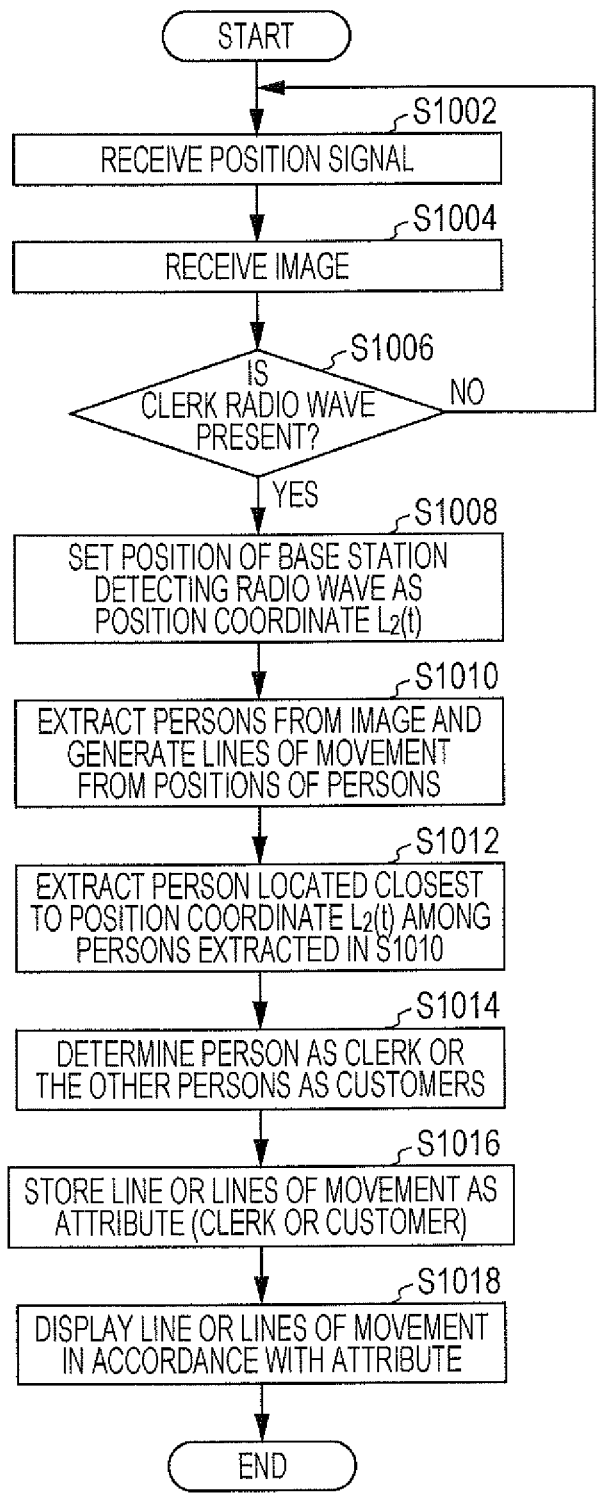
FIG. 10 is a flowchart illustrating an example of processing according to the second exemplary embodiment.

FIG. 10 is a flowchart illustrating an example of processing according to the second exemplary embodiment.

In step S1002, the signal transmitting/receiving module 110 receives a position signal from the position-signal storing module 184 of the first position-information extracting module 180.

In step S1004, the second position-attribute calculating module 120 receives an image from the video storing module 194 of the second position-information extracting module 190.

In step S1006, the person position-coordinate deriving module 815 determines whether a radio wave representing a clerk is present in the position signal. If the radio wave is present (if communication has been performed), the processing proceeds to step S1008. In the other case, the processing returns to step S1002.

In step S1008, the person position-coordinate deriving module 815 sets, as the position coordinate $L_2(t)$, the position of the base station detecting the radio wave.

In step S1010, the second position-attribute calculating module 120 extracts persons from the image, arranges the positions of the persons in a time series, and generates lines of movement of the persons from the positions.

In step S1012, the collating module 125 extracts a person located closest to the position coordinate $L_2(t)$ among the persons extracted in step S1010.

In step S1014, the attribute determining module 130 determines the person as a clerk or the other persons as customers.

In step S1016, the analysis-result storing module 135 stores the movement line information together with the attribute (a clerk or a customer).

In step S1018, the information displaying module 140 displays the line or lines of movement in accordance with the attribute.

Note that a condition that a distance between the position coordinate $C^2_k(t)$ and the position coordinate $L_2(t)$ takes on a predetermined value or lower may be used in step S1012. Further, a condition that only one person satisfying the aforementioned condition is present may be used.

Third Exemplary Embodiment

Figure 11:
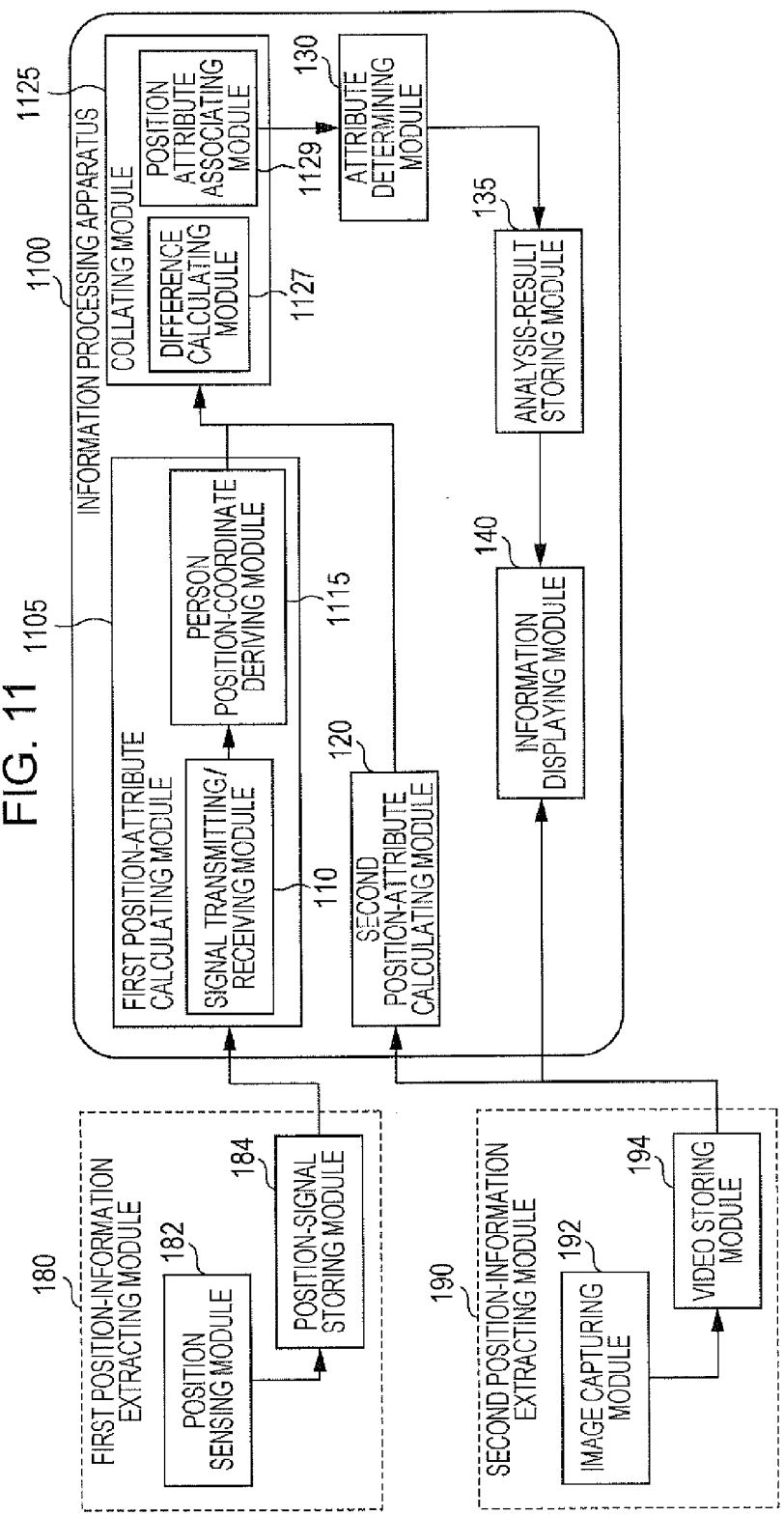
FIG. 11 is a diagram conceptually illustrating an example of a module configuration in a third exemplary embodiment.

FIG. 11 is a diagram conceptually illustrating an example of a module configuration in a third exemplary embodiment.

An information processing apparatus 1100 includes a first position-attribute calculating module 1105, the second position-attribute calculating module 120, a collating module 1125, the attribute determining module 130, the analysis-result storing module 135, and the information displaying module 140. A structure contains the multiple position sensing modules 182 installed therein.

The position-signal storing module 184 is connected to each position sensing module 182 and the first position-attribute calculating module 1105 of the information processing apparatus 1100.

The video storing module 194 is connected to the image capturing module 192 and the second position-attribute calculating module 120 and the information displaying module 140 of the information processing apparatus 1100.

The first position-attribute calculating module 1105 includes the signal transmitting/receiving module 110 and a person position-coordinate deriving module 1115 and is connected to the position-signal storing module 184 of the first position-information extracting module 180.

The signal transmitting/receiving module 110 is connected to the person position-coordinate deriving module 1115.

The person position-coordinate deriving module 1115 is connected to the signal transmitting/receiving module 110 and the collating module 1125. The person position-coordinate deriving module 1115 sets the position of a first-type person carrying a mobile terminal in accordance with the signal intensity of communication between the mobile terminal and the multiple position sensing modules 182 installed in the structure. A region containing the position is denoted by $L_3(t)$. Note that t represents the date and time when the communication is performed. The higher the signal intensity is, the shorter a distance from a corresponding one of the position sensing modules 182 is. For example, the person position-coordinate deriving module 1115 may derive the position coordinate range $L_3(t)$ in the structure, of the mobile terminal, on the basis of the intensities of multiple signals received by the multiple position sensing modules 182 or by the mobile terminal. Note that the position coordinate range $L_3(t)$ may be the position coordinate of one point or an area.

The second position-attribute calculating module 120 in the third exemplary embodiment corresponds to the second position-attribute calculating module 120 in the first exemplary embodiment. In other words, the second position-attribute calculating module 120 is connected to the collating module 1125 and the video storing module 194 of the second position-information extracting module 190. The second position-attribute calculating module 120 extracts a person from an image captured by the image capturing module 192 installed in the structure. Extraction of the person makes it possible to extract the position of the person. In addition, acquisition of the position in a time series makes it possible to extract a line of movement. As a technology for extracting a person from an image, an existing technology may be used. For example, the human body recognition technology, the face recognition technology, and other technologies may be used. For example, the second position-attribute calculating module 120 may extract a person $P_k$ from an acquired image to derive a position coordinate $C^1_k(t)$ (k represents the person No. and t represents date and time) of a person in the store, from the position of the person $P_k$ in the image. It goes without saying that in a case where multiple persons are present in the captured image, the persons are extracted.

The collating module 1125 includes a difference calculating module 1127 and a position attribute associating module 1129 and is connected to the person position-coordinate deriving module 1115 and the second position-attribute calculating module 120. The attribute determining module 130 is connected to the position attribute associating module 1129 and the analysis-result storing module 135.

The collating module 1125 and the attribute determining module 130 associate a person extracted by the second position-attribute calculating module 120 with first-type-person information, in a case where a relationship between the position set by the person position-coordinate deriving module 1115 and the position of the extracted person satisfies a predetermined condition.

The "predetermined condition" may be, for example, a condition that the person is located closest to the overlapping position of regions each within a different radius defined in accordance with the signal intensity from the position of a corresponding one of the multiple position sensing modules 182. If this condition is satisfied, that is, if the person is located closest to the position set by the person position-coordinate deriving module 1115, the person is assigned an attribute representing a first-type person.

The difference calculating module 1127 is connected to the position attribute associating module 1129. The difference calculating module 1127 calculates a difference between the position coordinate range $L_3(t)$ and the position coordinate $C^1_k(t)$. For example, the difference calculating module 1127 calculates, as the difference, the Euclidean distance between the position coordinate range $L_3(t)$ and the position coordinate $C^1_k(t)$. There are two types of position coordinate ranges $L_3(t)$: a point and an area. The point and the area will be described later by using FIGS. 14 and 15, respectively.

The position attribute associating module 1129 is connected to the difference calculating module 1127 and the attribute determining module 130. If a person is located closest to the position from which the smallest difference from the position coordinate range $L_3(t)$ is calculated by the difference calculating module 1127, the position attribute associating module 1129 determines the person to be the same person as the person at the position coordinate $C^1_k(t)$. Then, the position coordinate range $L_3(t)$ and the position coordinate $C^1_k(t)$ are associated with the person $P_k$. For another time t, a position coordinate range $L_3(t')$ at a certain time t' and a position coordinate $C^1_k(t')$ that are associated with the person $P_k$ are also collated.

The attribute determining module 130 is connected to the position attribute associating module 1129 and the analysis-result storing module 135. The attribute determining module 130 determines whether the position coordinate in the camera-captured image is that of a first-type person (such as a clerk) or a second-type person (such as a customer) on the basis of a result of the comparison by the position attribute associating module 1129. Specifically, the person at the position coordinate $C^1_k(t)$ who is identifiable as the person in the position coordinate range $L_3(t)$ is assigned the attribute representing a first-type person.

The attribute determining module 130 may also associate, with second-type-person information, a person other than the person associated with the first-type-person information. Specifically, the position coordinate $C^1_k(t)$ that is not associated with the first-type-person information is associated with an attribute representing a second-type person.

Figure 12:
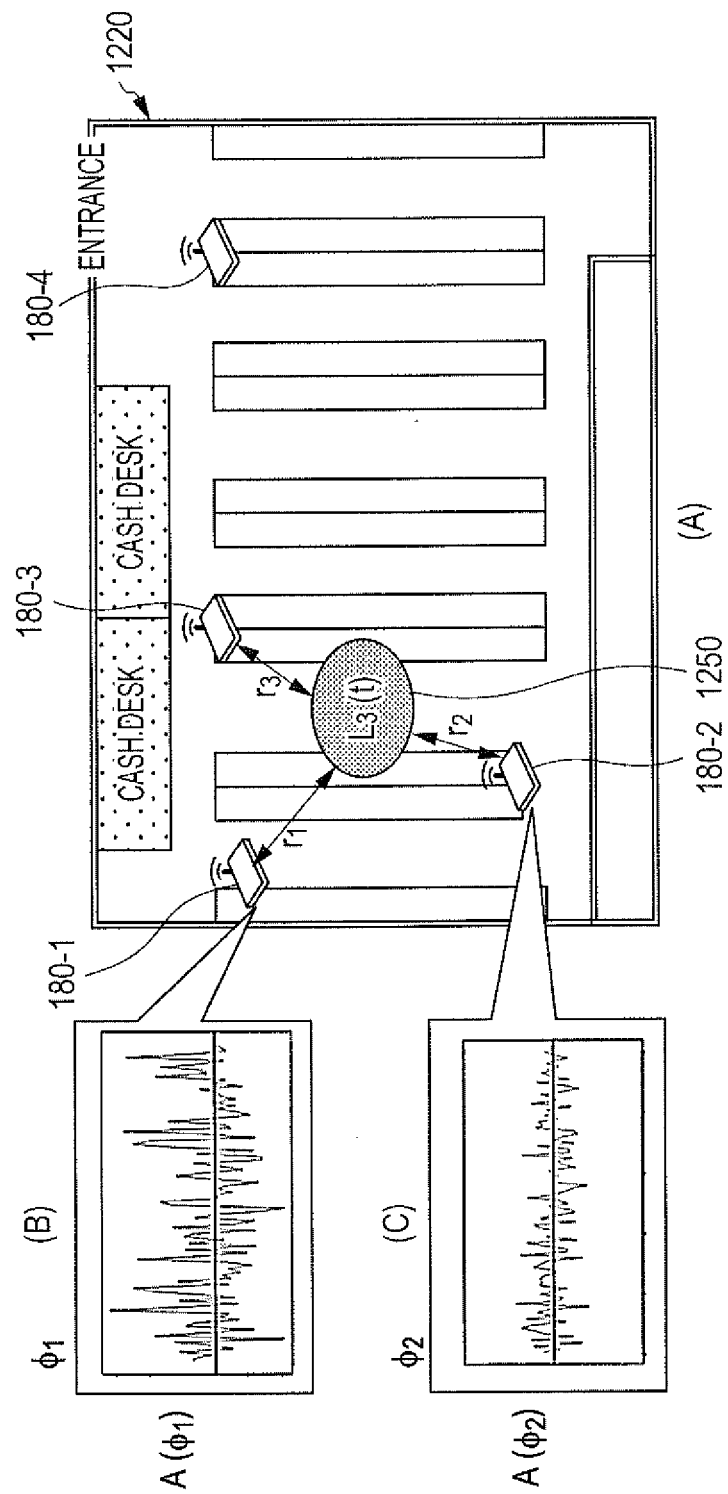
FIG. 12 is an explanatory diagram illustrating an example of processing according to the third exemplary embodiment.

FIG. 12 is an explanatory diagram illustrating an example of processing according to the third exemplary embodiment (performed by the person position-coordinate deriving module 1115).

In the example in Part (A) of FIG. 12, the first position-information extracting modules 180-1, 180-2, 180-3, and 180-4 in a store view 1220 receive a signal from a mobile terminal. The graph example in Part (B) of FIG. 12 illustrates a waveform of the signal detected by the first position-information extracting module 180-1. The graph example in Part (C) of FIG. 12 illustrates a waveform of the signal detected by the first position-information extracting module 180-2. In this case, a region 1250 is set as the position coordinate range $L_3(t)$, the region 1250 being defined by distances ($r_1$, $r_2$, and $r_3$) that correspond to the signal intensities of signals detected by the first position-information extracting modules 180-1, 180-2, and 180-3, respectively.

The person position-coordinate deriving module 1115 assigns the attribute representing a clerk to the person located closest to the position coordinate $L_3(t)$ among persons extracted by the second position-attribute calculating module 120.

Figure 13:
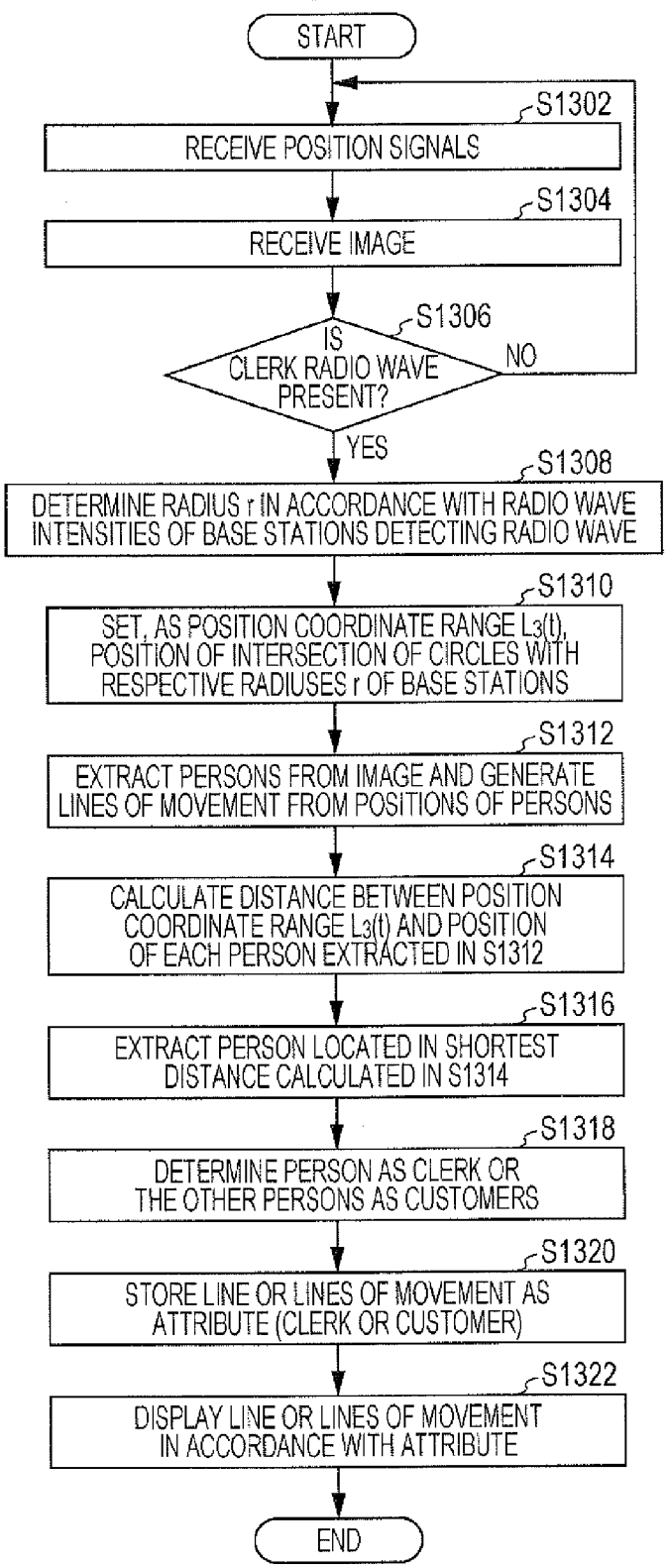
FIG. 13 is a flowchart illustrating an example of processing according to the third exemplary embodiment.

FIG. 13 is a flowchart illustrating an example of processing according to the third exemplary embodiment.

In step S1302, the signal transmitting/receiving module 110 receives a position signal from the position-signal storing module 184 of each first position-information extracting module 180.

In step S1304, the second position-attribute calculating module 120 receives an image from the video storing module 194 of the second position-information extracting module 190.

In step S1306, the person position-coordinate deriving module 1115 determines whether a radio wave representing a clerk is present in the position signal. If the radio wave is present (if communication has been performed), the processing proceeds to step S1308. In the other case, the processing returns to step S1302.

In step S1308, the person position-coordinate deriving module 1115 determines each radius r in accordance with the intensity of a radio wave of a corresponding one of the base stations detecting the radio wave representing a clerk.

In step S1310, the person position-coordinate deriving module 1115 sets, as the position coordinate range $L_3(t)$, the position of an intersection of circles with the respective radiuses r of the base stations.

In step S1312, the second position-attribute calculating module 120 extracts persons from the image, arranges the positions of the persons in a time series, and generates lines of movement of the persons from the positions.

In step S1314, the difference calculating module 1127 calculates a distance between the position coordinate range $L_3(t)$ and the position of each person extracted in step S1312.

In step S1315, the position attribute associating module 1129 extracts the person located in the shortest distance calculated in step S1314.

In step S1318, the attribute determining module 130 determines the person as a clerk or the other persons as customers.

In step S1320, the analysis-result storing module 135 stores the movement line information together with the attribute (a clerk or a customer).

In step S1322, the information displaying module 140 displays the line or lines of movement in accordance with the attribute.

Figure 14:
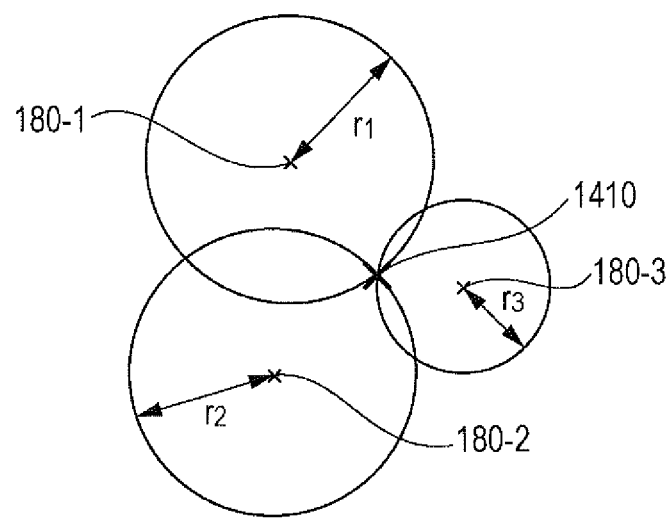
FIG. 14 is an explanatory diagram illustrating an example of the processing according to the third exemplary embodiment.

FIG. 14 is an explanatory diagram illustrating an example of the processing according to the third exemplary embodiment. Regions with radiuses $r_1$, $r_2$, and $r_3$, respectively, are generated in accordance with the signal intensities of the signals detected at the first position-information extracting modules 180-1, 180-2, and 180-3. The regions intersect at an intersection 1410 (one point). In this case, one of the persons extracted by the second position-attribute calculating module 120 who is located in the shortest distance from the intersection 1410 is determined as a clerk.

Figure 15:
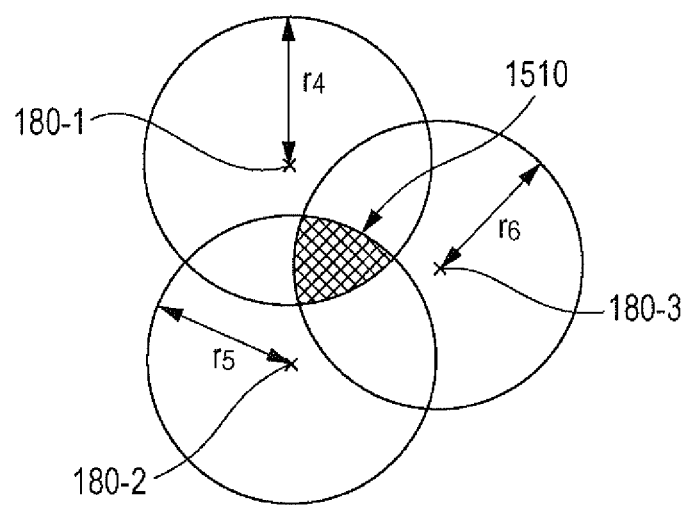
FIG. 15 is an explanatory diagram illustrating an example of the processing according to the third exemplary embodiment.

FIG. 15 is an explanatory diagram illustrating an example of the processing according to the third exemplary embodiment. Regions with radiuses $r_4$, $r_5$, and $r_6$, respectively, are generated in accordance with the signal intensities of the signals detected at the first position-information extracting modules 180-1, 180-2, and 180-3. The regions overlap in a region 1510. In other words, in a case where the regions defined in accordance with the respective signal intensities overlap in an area, one of the persons extracted by the second position-attribute calculating module 120 who is located in the shortest distance from the center of the region 1510 may be determined as a clerk. Alternatively, in a case where only one person is present in the region 1510, the person may be determined as a clerk.

Figure 16:
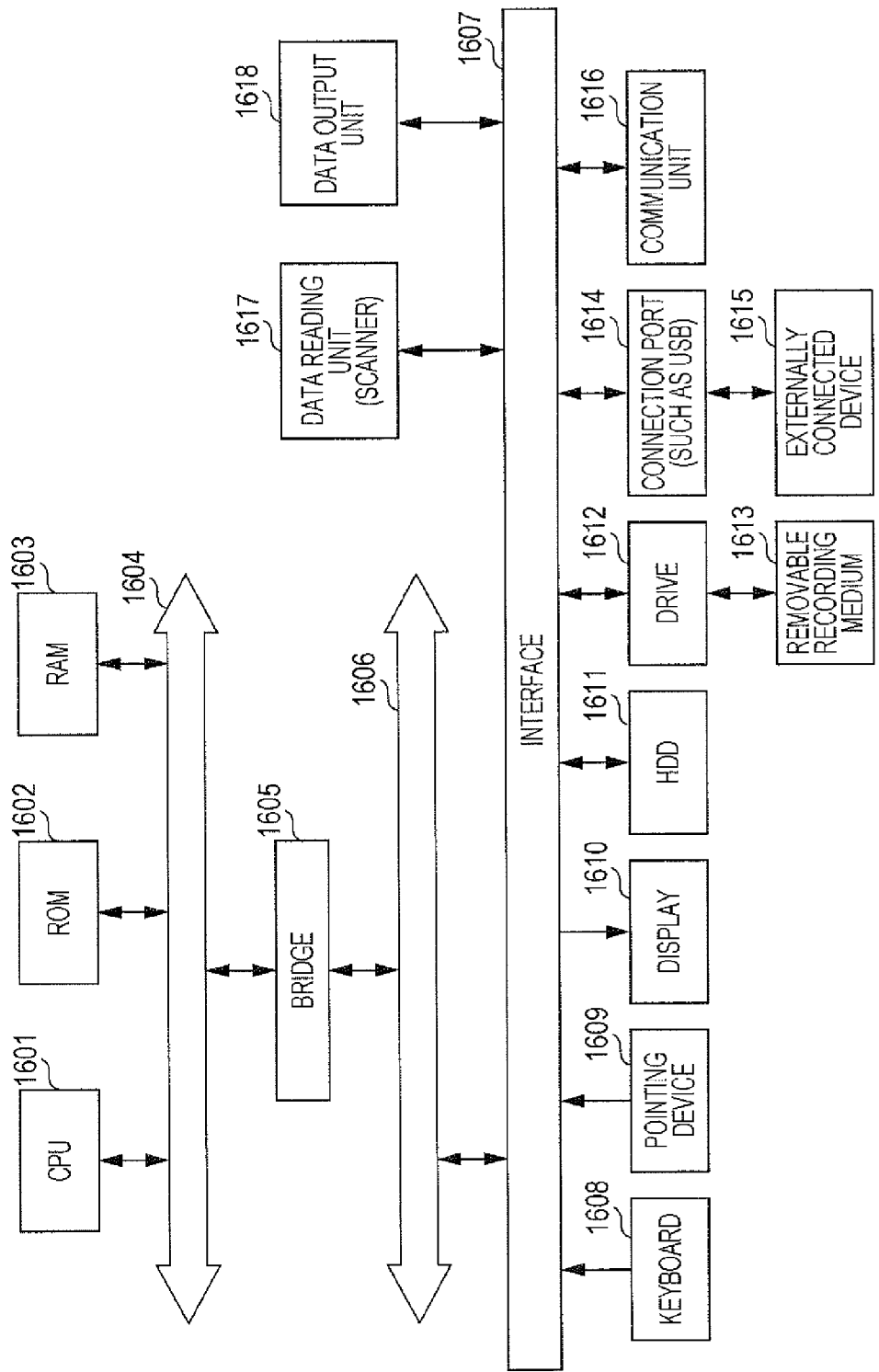
FIG. 16 is a block diagram illustrating an example of a hardware configuration of a computer implementing the present exemplary embodiments.

An example of a hardware configuration of each information processing apparatus of the corresponding exemplary embodiment will be described with reference to FIG. 16. FIG. 16 illustrates a configuration of, for example, a personal computer (PC) and illustrates an example of a hardware configuration including a data reading unit 1617 such as a scanner and a data output unit 1618 such as a printer.

A CPU 1601 is a controller that executes processing in accordance with a computer program describing a sequence for implementing the various modules described in the aforementioned exemplary embodiments. Examples of the modules include the first position-attribute calculating module 105, the signal transmitting/receiving module 110, the person position-coordinate range deriving module 115, the second position-attribute calculating module 120, the collating module 125, the attribute determining module 130, the analysis-result storing module 135, the information displaying module 140, the first position-attribute calculating module 805, the person position-coordinate deriving module 815, the first position-attribute calculating module 1105, the person position-coordinate deriving module 1115, the collating module 1125, the difference calculating module 1127, and the position attribute associating module 1129.

A read only memory (ROM) 1602 is used to store the program used by the CPU 1601, operational parameters, and the like. A random access memory (RAM) 1603 is used to store the program used when the CPU 1601 is implemented, parameters appropriately varying when the CPU 1601 is implemented, and the like. These components are mutually connected by a host bus 1604 including a CPU bus or the like.

The host bus 1604 is connected to an external bus 1606 such as a peripheral component interconnect/interface (PCI) bus with a bridge 1605 placed in between.

A keyboard 1608 and a pointing device 1609 such as a mouse are input devices operated by an operator. A display 1610 includes a liquid crystal display device, a cathode ray tube (CRT), and the like and displays various pieces of information as text information and image information.

A hard disk drive (HDD) 1611 has a hard disk incorporated therein, drives the hard disk, and records and reproduces the program executed by the CPU 1601 and information. In the hard disk, position signals, images, lines of movement, and the like are stored, and further, various computer programs such as various data processing programs are stored.

A drive 1612 reads out data or a program recorded in a removable recording medium 1613 such as a magnetic disk, an optical disk, a magneto-optical disk, or a semiconductor memory that is attached to the drive 1612 and supplies the data or the program to the RAM 1603 connected to the drive 1612 with an interface 1607, the external bus 1606, the bridge 1605, and the host bus 1604 located in between. The removable recording medium 1613 is also usable as a data recording area like the hard disk.

A connection port 1614 is a port for connection with an externally connected device 1615 and has a connection unit meeting standards such as universal serial bus (USE) and IEEE1394. The connection port 1614 is connected to the CPU 1601 and the like with the interface 1607, the external bus 1606, the bridge 1605, the host bus 1604, and the like located in between. A communication unit 1616 is connected to a communication network and executes data communication processing for external devices. The data reading unit 1617 is, for example, a scanner and executes processing of reading a document. The data output unit 1618 is, for example, a printer and executes processing of outputting document data.

The hardware configuration of the information processing apparatus in FIG. 16 merely illustrates a configuration example, and the configuration of each of the present exemplary embodiments is not limited to the configuration in FIG. 16. As long as a configuration enables the modules described in each exemplary embodiment to be run, the configuration may be employed. For example, at least one of the modules may be configured to run on hardware dedicated to the module (such as an application specific integrated circuit (ASIC)). At least one of the modules may be in an external system to be connected through a communication network. Further, multiple systems each serving as the system in FIG. 16 may be mutually connected through a communication network to work in cooperation with each other. In particular, the configuration may be incorporated in a copier, a fax machine, a scanner, a printer, a multifunctional product (image processing device having two or more functions of a scanner, a printer, a copier, or a fax machine), and other devices.

Two or more of the first, second, and third exemplary embodiments may be combined with each other. For example, the three exemplary embodiments may be combined together to associate coordinates with the first-type-person information under majority rule. Any one of the first, second, and third exemplary embodiments may be used by using a switch (including a hardware switch and a software switch). Any one of the first, second, and third exemplary embodiments may also be selected according to the density, the arrangement, or the like of the position sensing modules 182 installed in the structure. For example, if the density is equal to or higher than a predetermined density, the second exemplary embodiment may be selected. If the position sensing modules 182 are arranged in an equilateral triangle, the third exemplary embodiment may be selected. In the other cases, the first exemplary embodiment may be selected.

Note that the following condition may be used in the aforementioned exemplary embodiments. Specifically, the image capturing module 192 captures an image of a person located near a certain position sensing module 182 (a base station or the like), the person having a certain image feature. If time when the person is located near the position sensing module 182 (a base station or the like) matches time when a position sensing module 182 (a base station or the like or a mobile terminal) on a temporal axis, the person having the image feature is determined as a clerk. Note that the matching includes perfect matching and matching in a case where a difference between the times is within a predetermined threshold.

In addition, when a value is compared with a predetermined value, the phrases "equal to or higher than", "equal to or lower than", "higher than", and "lower than" have been used in the description of the aforementioned exemplary embodiments. However, if the value combination is consistent, the phrases may be replaced with the phrases "higher than", "lower than", "equal to or higher than", and "equal to or lower than", respectively.

Note that the program described above may be provided by using a recording medium having the program recorded therein, and may be provided by using a communication unit. In this case, for example, the program described above may be regarded as an exemplary embodiment of the invention of a "non-transitory computer readable medium having a program recorded therein".

The "non-transitory computer readable medium having a program recorded therein" refers to a computer readable recording medium having a program recorded therein that is used for installation, execution, distribution, and the like of a program.

Examples of the recording medium include a digital versatile disk (DVD) supporting "DVD-R, DVD-RW, DVD-RAM, and the like" that are standards designated by the DVD Forum and "DVD+R, DVD-SRW, and the like" that are standards designated in accordance with "DVD+RW; a compact disc (CD) such as a CD read-only memory (CD-ROM), a CD recordable (CD-R), a CD rewritable (CD-RW), or the like; a Blu-ray (registered trademark) disc; a magneto-optical disk (MO); a flexible disk (FD); a magnetic tape; a hard disk; a ROM; an electrically erasable and programmable ROM (EEPROM (registered trademark)); a flash memory; a RAM; and a secure digital (SD) memory card.

The aforementioned program or part of the program may also be saved on the recording medium to be stored or distributed. The program or part thereof may be transmitted through communication by using a transmission medium such as a wired network used for a local area network (LAN), a metropolitan area network (MAN), a wide area network (WAN), the Internet, an intranet, an extranet, or the like; a wireless communication network; or a combination of these. Alternatively, the program or part thereof may be transmitted by using carrier signals.

Further, the program may be part of another program, or may be saved on a recording medium together with another program. The program may also be divided to be saved on multiple recording media. The program may be saved in any manner such as by being compressed or encrypted, as long as the program is restorable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a setting unit that sets a position of a first-type person in a region within a predetermined distance from a communication device installed in a structure when the communication device communicates with a mobile terminal carried by the first-type person;
an extracting unit that extracts at least one person from an image captured by an image capturing device installed in the structure; and
an associating unit that associates the extracted at least one person with information indicating the first-type person when a relationship between the region and the position of the at least one person satisfies a predetermined condition,
wherein the predetermined condition is satisfied when the at least one person includes only one person in the region within the predetermined distance from the communication device.

2. The information processing apparatus according to claim 1, wherein
the associating unit associates, with information indicating a second-type person, a person other than the person associated with the information indicating the first-type person.

3. An information processing apparatus comprising:
a setting unit that sets a position of a first-type person in accordance with signal intensities in communication between a plurality of communication devices in a structure and a mobile terminal carried by the first-type person;
an extracting unit that extracts a plurality of persons from an image captured by an image capturing device installed in the structure; and
an associating unit that associates an extracted person of the plurality of persons with information indicating the first-type person when a relationship between positions of the plurality of communication devices and the position of the person satisfies a predetermined condition,
wherein the predetermined condition is satisfied when the person located in a shortest distance between a position of each of the plurality of persons extracted and a position determined by a range of the signal intensities.

4. The information processing apparatus according to claim 3, wherein
the associating unit associates, with information indicating a second-type person, a person other than the person associated with the information indicating the first-type person.

5. A non-transitory computer readable medium storing a program causing a computer to execute a process, the process comprising:
setting a position of a first-type person in a region within a predetermined distance from a communication device installed in a structure when the communication device communicates with a mobile terminal carried by the first-type person;
extracting at least one person from an image captured by an image capturing device installed in the structure; and
associating the extracted at least one person with information indicating the first-type person when a relationship between the region and the position of the at least one person satisfies a predetermined condition,
wherein the predetermined condition is satisfied when the at least one person includes only one person in the region within the predetermined distance from the communication device.

6. A non-transitory computer readable medium storing a program causing a computer to execute a process, the process comprising:
setting a position of a first-type person in accordance with signal intensities in communication between a plurality of communication devices in a structure and a mobile terminal carried by the first-type person;
extracting a plurality of persons from an image captured by an image capturing device installed in the structure; and
associating an extracted person of the plurality of persons with information indicating the first-type person when a relationship between positions of the plurality of communication devices and the position of the person satisfies a predetermined condition,
wherein the predetermined condition is satisfied when the person located in a shortest distance between a position of each of the plurality of persons extracted and a position determined by a range of the signal intensities.

* * * * *